April 21, 1959   F. C. HIRDLER, JR   2,883,275
PROCESS OF REMOVING MATERIAL FROM A WORK PIECE
Filed April 8, 1955   2 Sheets-Sheet 1

INVENTOR
FAIRBANKS C. HIRDLER, JR.
BY
ATTORNEY.

April 21, 1959 F. C. HIRDLER, JR 2,883,275
PROCESS OF REMOVING MATERIAL FROM A WORK PIECE
Filed April 8, 1955 2 Sheets-Sheet 2
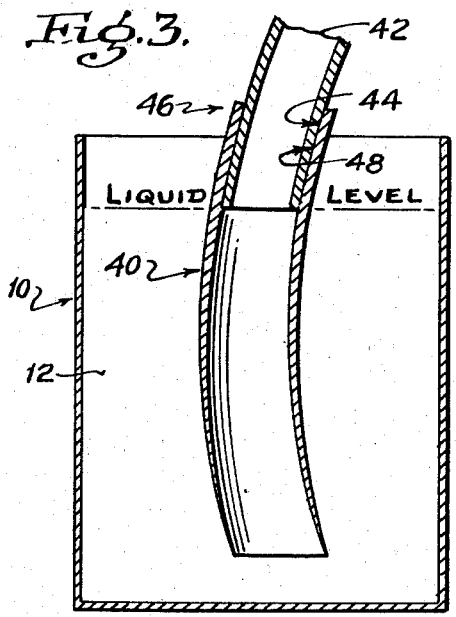
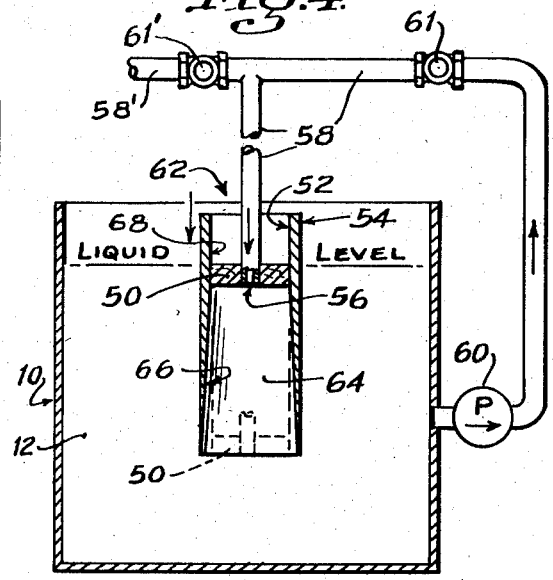
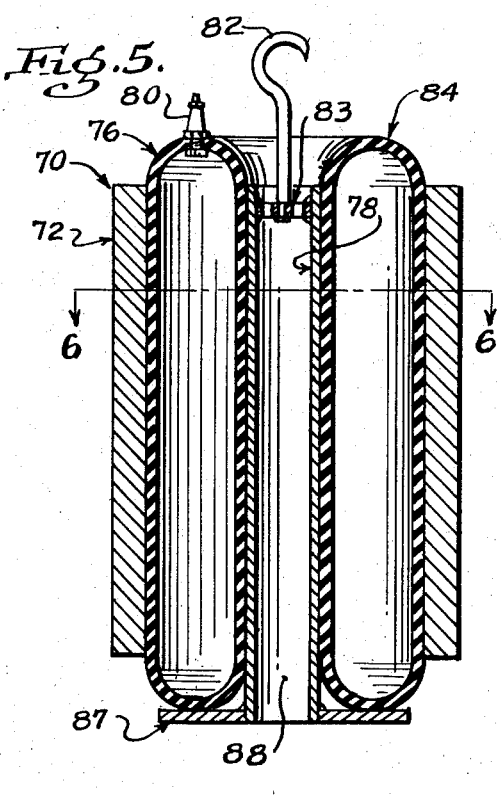
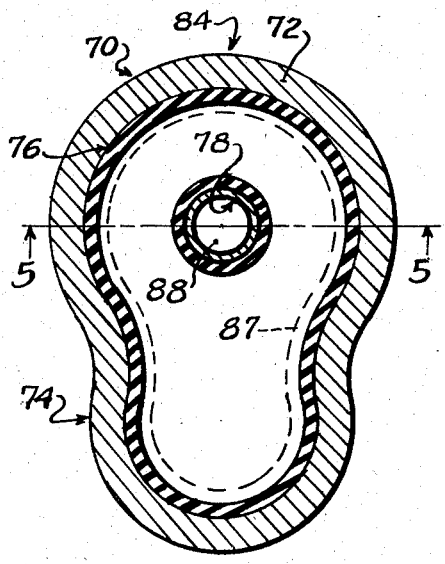
INVENTOR
FAIRBANKS C. HIRDLER, JR.
BY
ATTORNEY.

United States Patent Office 2,883,275
Patented Apr. 21, 1959

2,883,275

PROCESS OF REMOVING MATERIAL FROM A WORK PIECE

Fairbanks C. Hirdler, Jr., Los Angeles, Calif., assignor to Turco Products, Inc., Los Angeles, Calif., a corporation of California Application April 8, 1955, Serial No. 500,096

9 Claims. (Cl. 41—43)

This invention relates to removal of material from a work piece, e.g., composed of a metal, by a chemical etching solution. More particularly, the invention is directed to a novel procedure for producing tapered surfaces where the tapering is on an internal rather than an external surface of the work piece, e.g., production of a tapered hole in hollow objects such as in tubing.

Cutting and machining various types of holes in objects, e.g. of metal, is of course well known. In some cases, the side walls of tubing and other similar simple and symmetrical objects may be tapered by mechanical means if the taper is simple in nature. However, as far as known to me, it has heretofore not proved practically feasible to produce tapers on complicated parts where the surface is not a plane surface or a surface of revolution.

Thus, in the case of a piece of curved tubing or tubing bent into a complicated shape prior to tapering, production of an internal taper could not, to my knowledge, be accomplished commercially by present machining techniques. Also, production of a tapered hole in a metal billet having a hole with a non-symmetrical cross-section, i.e., other than a surface of revolution, would be most difficult by machining, especially where the hole does not extend through the part and has a curve or series of bends therein. Sometimes the side walls of tubing are not uniform in thickness as the hole is not centered in the tubing. The tapering of such a hole from one end to the other of a piece of tubing would be very difficult with present machining techniques as it would be difficult to center the internal hole, and such machining would be out of the question if the tubing were curved, except by specially designed single purpose tools.

One object of this invention is the removal of material from an internal surface of an object.

Another object is the provision of procedure for tapering an internal surface of a part.

Yet another object is to provide more procedure for tapering the internal surface of a hole or aperture in an object.

A still further object is to afford novel and relatively inexpensive procedure for tapering the sides of a hole in a metal part by chemical etching.

Yet another aim of the invention is the provision of a method for tapering the sides of a hole of irregular shape in parts of various types such as tubes, billets and the like.

Other objects and advantages will appear hereinafter.

I have found that the internal surface of a hole or aperture in an object can be tapered as desired by a unique chemical etching or milling procedure so that regardless of the shape of the hole in the part, the side walls of such hole can be uniformly tapered along the length thereof. While a taper can be formed on the external surface of a part by immersing such part in an etching solution or withdrawing the part from such solution, at a controlled uniform rate, such procedure is not suitable for production of a taper on an internal surface of a part, e.g., the walls of a bore therein. This is due to the fact that maximum control of taper angle cannot be readily achieved by this technique since the gas, usually generated in the etching reaction, rushes through the internal portion of the part with such violence as to carry etching liquid up through the part at a relatively high velocity. This is particularly true where the bore is relatively small in cross-sectional area, so that the disengaging surface at the level of the liquid in the bore is small. This causes erosion along the upper portion of the internal surface so that the degree of taper is greatly minimized, and in effect producing an etched internal surface which is almost evenly etched along the length thereof.

I have now found that I can produce a taper of the amount desired on the internal surface of a part, particularly a metal part, by a technique which comprises masking that portion of the internal surface which it is not desired to etch at any particular point in the etching operation. The invention accordingly involves initially masking the internal surfaces of the part from the etching solution, contacting the part and the bore or internal surface thereof with the etching solution, and unmasking said internal surface at a predetermined rate to expose varying portions of the surface to the action of the etching solution.

According to one embodiment, the invention can be carried out by inserting a flexible tubular member, preferably chemically resistant to the etching solution, in the aperture of the part, the walls of which aperture are to be tapered. Such tubular member is in tight but movable engagement with the internal surface. The assembly is then positioned in or closely adjacent an etching bath, as will be pointed out in detail hereinafter, and the tubular member is then moved relative to the internal surface of the part, and the portion of the internal surface thus unexposed is brought into contact with the etching solution during the period of such movement. In this manner, successively greater portions of the internal surface to be etched are brought into contact with the etching solution, to thereby vary the period of etching of said successive internal surface portions by the solution.

This results in an efficient taper of the degree desired being formed on the internal surface of, or along a bore or hole in, the part, since the gases generated in the etching and carrying intrained etching solution pass through the tubular member, which effectively protects the internal surface of the part covered by the tube, from the eroding action of such gases or etching by entrained solution or spray produced by the gases.

The invention will be more readily understood by reference to the description below of certain preferred embodiments, taken in connection with the accompanying drawings, wherein:

Fig. 3 illustrates production of a uniform taper in a bent tubular work piece according to the invention;

Fig. 4 illustrates additional techniques for carrying out the invention;

Fig. 5 is a cross section of an assembly illustrating another modification of the invention technique; and Fig. 6 is a horizontal section taken on line 6—6 of Fig. 5.

Figure 1:
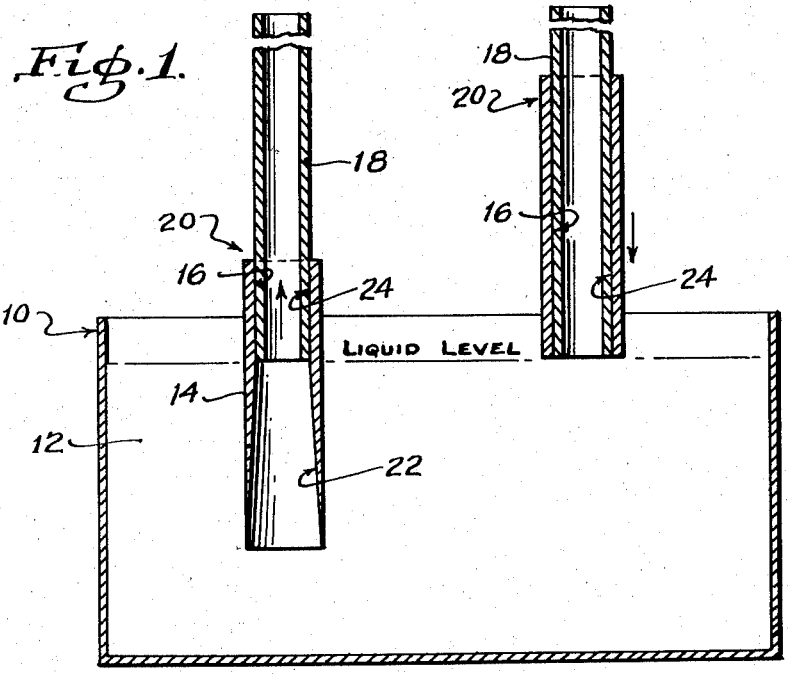
Figure 1 is an illustration of procedure for forming an internal taper in a tubular work piece according to the invention.

Referring to Fig. 1 of the drawings, numeral 10 represents a tank containing a body of etching solution 12 which may be either of the acid or alkaline type depending on the particular metal or material being etched. Where aluminum or its alloys are to be etched, the etching treatment is carried out in an aqueous solution containing an alkali such as sodium or potassium hydroxide, trisodium phosphate, sodium carbonate or the like, or mixtures thereof. Concentration of the alkali etching solution can be in the range of 0.1 to 10 normal. Temperature of the solution may range, say from room temperature, for example, 60° to 70° F., to about 212° F. Generally, a hot solution is employed, with temperature maintained in a range from about 140° F. to about 210° F. during treatment.

A cylindrical part 14 having a bore 16 is desired to be provided with a downward internal taper, as viewed in in Fig. 1. A flexible tube 18 of a suitable material resistant to attack by the etching solution, e.g., of rubber or plastic, and having an external diameter somewhat larger than the internal diameter of bore 16, is inserted into the bore of part 14, as seen in the assembly designated 20 in Fig. 1, so that the flexible tube is in snug position against the internal surface of the bore 16 of the part. While the tube 18 thus protects the internal bore 16 of the part, said tube can be moved relative to the part to expose successive portions of the internal surface of bore 16 thereof.

The assembly 20 is positioned vertically at the surface of the etching solution, with the bottom ends of both the part 14 and inner tube 18 flush with each other at the solution surface. With the tube 18 held stationary by suitable means (not shown) the part 14 is slowly pushed downwardly into the solution at a substantially uniform rate. As the part is moved downwardly off the tube 18, successively greater portions of the internal surface of the bore 16 become exposed to the etching solution to produce the internal taper 22 illustrated in Fig. 1. By varying the speed of immersion of part 14, a non-uniform taper can be produced. The nature of the taper formed can be controlled by the rate of immersion of the part, knowing the concentration and temperature of the solution. Following formation of the desired taper, the part 14 is rapidly removed from the etching bath.

It is thus seen that the gas generated in the etching reaction passes up the inner protective tube 18 without contacting the upper surface 24 of the bore 16 of the part with which such tube remains in contact. Thus, such gas and the entrained etching solution droplets carried thereby, or spray caused by agitation at the surface of the liquid, is prevented from contacting such upper surface covered by the tube 18 to corrode it and diminish the taper being formed. Thus, only the part immersed in the liquid is etched. Also, the technique involving the use of such tube permits controlled removal of the generated gas from the proximity of the bath, thus preventing corrosion of overhead equipment, and the entrained solution can be collected from the gases and returned to the bath. Suitable connection to the tube 18 is not shown but can be readily supplied, as will be understood by those skilled in the art.

Figure 2:
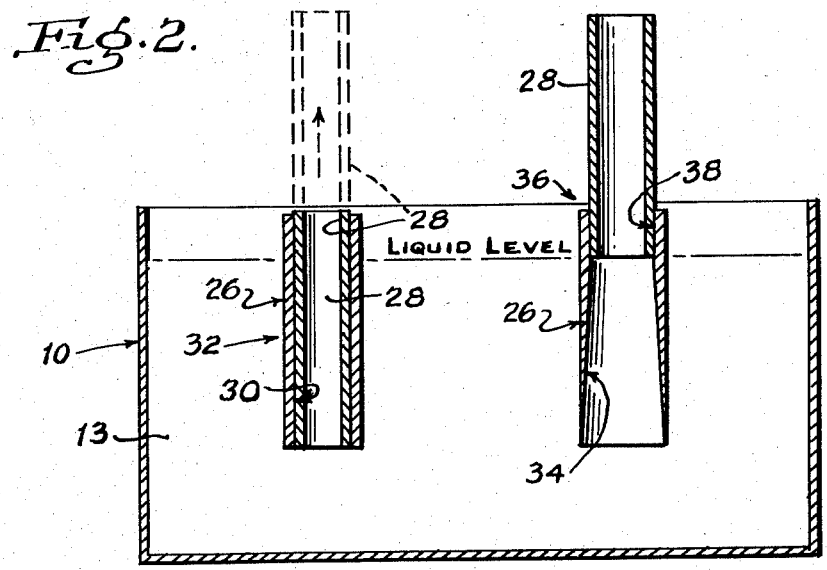
Fig. 2 is an illustration similar to Fig. 1 showing alternative procedure for producing a similar internal taper.

In Fig. 2, cylindrical part 26 having a bore 30 is fitted with a flexible tube 28, as in the case of Fig. 1, the tube 28 being contained in snug engagement with the wall of the bore 30. This assembly, designated 32, is placed in the etching solution 13 in a vertical position, the tube 28 initially covering all of the internal surface 30 of the part 26 which is below the surface of the solution. The upper portions of the part 26 and tube 28 are located above the surface of the solution. In this modification, the inner tube 28 of the assembly is pulled upwardly out of the bore 30 of the part, while the part is held stationary in the solution. The tube 28 is withdrawn at a rate to give the desired configuration to the inner bore surface. As in the previous embodiment of Fig. 1, successively greater portions of the internal surface of the bore 30 thus become exposed to the etching solution as the tube 28 is withdrawn, as shown by the dotted lines in Fig. 2. This produces the internal taper 34 similar to the tapper 22 in Fig. 1 when the tube 28 has been raised to the position shown in assembly 36. Here also, the gas generated in the reaction passes up tube 28 without contacting the upper surface 38 of the bore 30 of part 26, with which the tube remains in contact. Hence, the evolved gas with entrained etching solution, or produced spray, is prevented from contacting the inner surface 38 of the part 26, which is not desired to be etched in the bath at that time, so that the desired taper can be formed.

While I have illustrated the application of my technique to a cylindrical inner surface in Figs. 1 and 2, it will be understood that the surface need not be cylindrical but may be any uniform surface which will receive a tubular member to cover the inner surface to act as a gas conduit and which may be withdrawn. Thus, the inner bore may be of any cross-sectional configuration, such as a square, rectangle, or any polygon, when the protective tube is formed of similar geometry so that it may contact the entire surface snugly in the manner described above.

In Fig. 3 is illustrated the versatility of the invention technique in the production of an internal taper showing its application to a surface, other than a plane surface or a surface of revolution, in a bent tube indicated by numeral 40. A flexible hollow mandrel 42, having an external diameter of a size in relation to that of the bore 44 of the part 40 so that when positioned within said part the flexible mandrel, makes a snug and uniform contact with the walls of bore 44 and covers such walls along the entire length of part 40 to be internally etched. The assembly designated by numeral 46 is then positioned adjacent the surface of the etching solution, as in the case of assembly 20 of Fig. 1, or immersed in the etching solution as in the case of assembly 32 of Fig. 2, and the part 40 to be etched either withdrawn from mandrel 42 and gradually immersed in the solution, as illustrated in Fig. 1, or the flexible mandrel 42 gradually withdrawn upwardly out of tube 40, as indicated in Fig. 2, to form an internal taper 48 on the inner wall of the tube 40, without corroding the upper surface 48 of part 40 not contacted by the main body of etching solution.

Referring to Fig. 4, a cylindrical gasket or piston 50 is employed for producing an internal taper according to the invention, instead of a long flexible tube, as in Figs. 1 to 3. In the instant embodiment, the gasket 50, made of wood, rubber, plastic, or similar compositions which are unattacked by the chemical etching solution, has a diameter permitting it to make a snug but sliding fit against the internal wall 52 of the tubular part 54 to be internally tapered. Gasket 50 has a central aperture 56 therein communicating with one end of a pipe 58, the other end of the pipe communicating with the etching solution in tank 10. A pump 60 is provided in line 58 to circulate solution from tank 10 to the aperture 56 in gasket 50, for discharge into the tube 54 being etched.

In practice, the gasket is inserted into tube 54, and moved to the opposite lower end thereof as indicated in dotted lines in Fig. 4. The resulting assembly 62 is then placed in the etching bath in the position shown, with the upper portion of tube 54 located above the surface of the solution and the gasket at the lower end of the tube 54, as shown in dotted lines, so that in this initial position, the space 64 in the tube 54 contains no etching solution. The gasket 50 is then lifted upwardly at a uniform rate, permitting the etching solution to rise into the tube 54 and to etch increasingly greater areas of the internal wall 52 of the tube 54 thus exposed to the etching solution below the gasket. This produces a tapering 66 of the inner wall of tube 54 exposed in the above manner to the etching solution, while the inner wall portion 68 of the tube above gasket 50 is unetched.

During the etching period, etching solution is pumped from the tank through pipe 58 and into the tube 54 below the gasket 50 to fill the tube 54, valve 61 being open and valve 61' in side take-off 58' being closed. This circulation of etching fluid downwardly through tube 54 effects more efficient and rapid etching and at the same time tends to sweep gas generated in the etching reaction out through the bottom of tube 54 into the main body of etching solution.

If desired, the etching of part 54 can be carried on in an alternative manner by positioning the assembly 62 at the surface of the etching solution as in the case of assembly 20 in Fig. 1, and the part 54 uniformly lowered into the solution while the piston 50 is held stationary at the surface of the solution.

Instead of circulating liquid via pump 60, as described above, valve 61 may be closed and valve 61' in side branch 58' opened to permit escape of gases, the entrained liquid draining back along the tube 58 or returned to the bath after separation from the gases exiting via 58'.

In Fig. 5 is shown application of the invention for tapering a part 70 having a cross section of irregular configuration of any desired geometry. The part 70 as shown, which is essentially tubular in shape, has an enlarged cylindrical section 72 communicating with a smaller adjacent cylindrical section 74.

An expansible bag or tube 76 of toroidal cross section made of a flexible material such as rubber or plastic, and inert to attack by the etching solution, is connected as by vulcanizing or cementing, to a central hollow mandrel 78 so that the bore of the toroid of the bag 76 is connected to the mandrel throughout its length. The lower end of the mandrel carries a plate 87 which has a geometry like the geometry of the internal cross section of the tube 70 and is sufficiently smaller to pass through the bore of the tubes 72 and 74. The bag 76 is fitted at its upper end with a valve 80 for inflating the bag with air and for deflating the bag and the mandrel has a hook 82 connected to its upper end to a spider 83 affixed to the walls of the tubular mandrel 78 for raising and lowering this assembly.

In operation, the mandrel-bag assembly designated by numeral 84, with the bag 76 deflated, is inserted into the tube 70 to be internally tapered, so that the mandrel is positioned approximately along the axis of the enlarged cylindrical section 72 of the tubular part 70 and the plate 87 is below the end of the part 70. The bag 76 is then inflated with air through valve 80, causing the outer surface of the bag to expand into tight engagement with the inner wall of section 72 and the inner wall of the adjacent section 74 of the part 70, as shown in Figs. 5 and 6, to cover the entire inner wall of the part The entire assembly shown in Fig. 6 is then immersed in an etching solution and the mandrel-bag assembly 84 is raised by means of hook 82 at a uniform rate. The mandrel 78 acting directly on the adjacent wall and on the plate 87 causes a withdrawal of the tube from the part, as in the case of inner tube 28 in Fig. 2, to permit the etching solution to etch the increasingly greater exposed internal surface areas 86 of the tubular part 70 below assembly 84, released from engagement with the bag 76 during ascent thereof. This produces a uniform taper along the internal surface of part 70, including the internal wall of section 72 as well as that of section 74 of the part. The gas generated in the etching reaction passes upwardly through the bore 88 of the mandrel 78, and hence is prevented from making contact with the internal walls of the part 70, and is accordingly prevented from corroding these walls and minimizing the desired taper formed thereon.

From the above, it is seen that the process is particularly valuable in enabling the formation of tapers on an internal surface of an irregularly shaped part which could not be done by machining operations.

It will be understood that each of the parts 14, 26, 40, 54 and 70 which are internally tapered according to the invention is supplied with a mask, e.g., in the form of a chemical resist, on the outer surface of the part, to protect such surface from attack by the etching solution. However, if desired an external taper can be applied to these parts, in addition to an internal taper, by leaving the outer surface of the part unmasked, and immersing or withdrawing the part at a uniform rate from the solution, e.g., as illustrated in Fig. 1.

In the claims, the term "tubular guard member" or "guard tube" is intended to designate the flexible tubular bag 76 and the apertured gasket or piston 50, or their equivalents, as well as the flexible tubes 18, 28 and 42. Further, if desired, solid flexible members such as gasket 50, but without an aperture therein, can be employed, although an apertured or hollow tubular flexible member is preferred. Further, flexible members in the form of thick-walled sponge rubber inserts with metallic springs molded in the rubber to force the rubber against the inner side walls of the part may be employed.

While the above procedures may be carried out by manual manipulation of the parts, if the parts are sufficiently small to be manageable by workmen, mechanical means for suspending and moving the parts may be supplied, as will be understood by those skilled in the art. Means may also be provided for automatically moving the parts to give a predetermined internal configuration which may be of a uniform taper, as when the parts are moved at a uniform rate, or to produce any other desired geometry of the internal surface other than a conical section, by moving the parts at a time cycle other than uniform progression. Such machinery is disclosed and claimed in the copending application of William P. Langsfeld, Serial No. 470,245, filed November 22, 1954, now Patent No. 2,865,125.

The articles of manufacture of my invention produced by the processes of my invention include those whose apertures have their cross-sectional geometry varied along the length of the aperture. This is shown in all of the forms described above. In Figs. 1, 2, 3 and 4 the cross sections are all circular but the diameters of the circle increase along the length of the aperture due to the taper. In Fig. 5 the cross section is non-circular and its various diamters each vary in magnitude along the length of the aperture due to the taper. In Figs. 1, 2 and 4, the surfaces of revolution, being conical sections when the taper is uniform, or if generated by a non-uniform motion through the solution, have different sections, each of which are surfaces of revolution, whereas, in the forms illustrated in Figs. 3 and 4 the surfaces produced are not surfaces of revolution since they cannot be generated by an element moving in a circular manner above an axis.

From all of the foregoing it is seen that I have provided a unique, inexpensive, and rapid method of producing internal tapers on variously shaped parts.

While I have described particular embodiments of my invention for the purpose of illustration, it should be understood that various modifications and adaptations thereof may be made within the spirit of the invention, as set forth in the appended claims.

I claim:

1. A method of removing material from an internal surface adjacent an aperture in a work piece, which comprises inserting a flexible tubular guard member in said aperture in tight but movable engagement with said internal surface, contacting said work piece with a chemical etching solution, moving said tubular guard member relative to said internal surface to expose successively varying portions of said surface to said etching solution, and contacting said successively varying internal surface portions with said etching solution for different time periods to thereby vary the period of etching of said successive surface portions by said solution, and producing a non-uniform etch along said internal surface.

2. A method of tapering the internal surface of an aperture in a work piece by a chemical etching solution, which comprises masking said internal surface to protect it from the action of said etching solution, unmasking successively greater portions of said surface at a predetermined rate, and contacting said exposed successively greater internal surface portions with said solution, to thereby vary the period of etching of said successive surface portions by said solution, and producing a tapered etch along said internal surface.

3. A method of removing material from the internal surface of an aperture in a work piece, which comprises applying a mask to at least a portion of the internal surface of said aperture to prevent action of an etching solution on said surface, moving said mask with respect to said surface to expose varying portions of said surface to an etching solution and contacting said varying exposed surface portions with said etching solution during movement of said mask with respect to said surface, and producing a differential etch along said internal surface.

4. A method of tapering the internal surface of an aperture in a work piece, by a chemical etching solution, which comprises inserting a flexible tubular member in said aperture, placing said member in tight but movable engagement with said internal surface, moving said tubular member relative to said internal surface to expose varying portions of said surface to an etching solution and contacting said varying exposed surface portions with said etching solution during movement of said tubular member with respect to said surface, and producing a tapered etch along said internal surface.

5. A method of removing material from an internal surface of an aperture in a work piece, which comprises inserting a flexible tubular member in said aperture, expanding said member into tight but movable engagement with said internal surface, moving said work piece and aperture into an etching solution while maintaining said tubular member substantially stationary, and exposing successively greater internal surface portions of said aperture to the action of said solution, and producing a non-uniform etch along said internal surface.

6. A method of tapering the internal surface of an aperture in a metal work piece, by a chemical etching solution, which comprises inserting a guard tube in said aperture, expanding said member into tight but movable engagement with said surface, said tube being resistant to attack by said solution, moving said work piece and aperture into an etching solution while maintaining said tube substantially stationary with at least a portion of said tube above said solution, and exposing successively greater internal surface portions of said aperture to the action of said solution for different time periods to thereby vary the period of etching of said surface portions, and producing a tapered etch along said internal surface.

7. A method of removing material from an internal surface of an aperture in a work piece, which comprises inserting a tubular guard member in said aperture, expanding said member into tight but movable engagement with said internal surface, placing said work piece and aperture in an etching solution, moving said tubular member out of said aperture while maintaining said work piece substantially stationary, and exposing successively greater internal surface portions of said aperture to the action of said solution, and producing a non-uniform etch along said internal surface.

8. A method of tapering the internal surface of an aperture in a metal work piece, by a chemical etching solution, which comprises inserting a flexible tube in said aperture, expanding said member into tight but movable engagement with said surface, said tube being resistant to attack by said solution, placing said work piece in an etching solution, moving said tube upwardly out of said aperture and said solution while maintaining said work piece substantially stationary, and exposing successively greater internal surface portions of said aperture to the action of said solution for different time periods to thereby vary the period of etching of said surface portions, and producing a tapered etch along said internal surface.

9. A method of removing material from the internal surface of an aperture in a work piece by a chemical etching solution, which comprises applying a tightly fitting flexible mask to at least a portion of said internal surface to protect it from the action of said etching solution, contacting said work piece with a chemical etching solution, moving said mask with respect to said work piece surface at a predetermined rate to expose varying successive portions of said surface to said etching solution, and contacting said varying exposed surface portions with said etching solution for different time periods during movement of said mask with respect to said surface, thereby to vary the period of etching over said surface, and producing a differential etch along said internal surface.

References Cited in the file of this patent

UNITED STATES PATENTS

| 881,915 | Farnham | Mar. 17, 1908 |
| 1,260,395 | Keller | Mar. 26, 1918 |
| 1,387,924 | Denneen | Aug. 16, 1921 |
| 1,920,409 | Lindemon et al. | Aug. 1, 1933 |
| 2,045,984 | Flory | June 30, 1936 |
| 2,065,595 | Lynch | Dec. 29, 1936 |
| 2,077,378 | Deren | Apr. 20, 1937 |
| 2,204,399 | Birdseye et al. | June 11, 1940 |
| 2,717,203 | Laar | Sept. 6, 1955 |
| 2,762,150 | Edds | Sept. 11, 1956 |
| 2,783,567 | Hull | Mar. 5, 1957 |

FOREIGN PATENTS

| 1,018 | Great Britain | Apr. 5, 1865 |